US012670332B2

(12) United States Patent
Reddy et al.

(10) Patent No.: US 12,670,332 B2
(45) Date of Patent: Jun. 30, 2026

(54) MACHINE-LEARNING TECHNIQUES TO DETERMINE AUTOMATED CONVERSATIONAL DATA

(71) Applicant: Adobe Inc., San Jose, CA (US)

(72) Inventors: Sreekanth Reddy, Bangalore (IN);
Prateek Gupta, Bangalore (IN);
Goutham Srivatsav Arra, Tracy, CA
(US); Camille Girabawe, San
Francisco, CA (US)

(73) Assignee: Adobe Inc., San Jose, CA (US)

( * ) Notice: Subject to any disclaimer, the term of this
patent is extended or adjusted under 35
U.S.C. 154(b) by 157 days.

(21) Appl. No.: 18/435,784

(22) Filed: Feb. 7, 2024

(65) Prior Publication Data

US 2025/0252266 A1     Aug. 7, 2025

(51) Int. Cl.
G06F 40/35          (2020.01)
H04L 51/02          (2022.01)

(52) U.S. Cl.
CPC .............. G06F 40/35 (2020.01); H04L 51/02
(2013.01)

(58) Field of Classification Search
CPC ...................................................... H04L 51/02
See application file for complete search history.

(56) References Cited

U.S. PATENT DOCUMENTS 9,916,366 B1 * 3/2018 Shukla .................. G06F 16/248
10,331,402 B1 * 6/2019 Spector ............... G10L 15/1815

2018/0082184 A1 * 3/2018 Guo ........................ G06F 40/30
2019/0114513 A1 * 4/2019 Mei ........................ G06F 40/253
2023/0095793 A1 * 3/2023 Agrawal ............... G06F 16/958
                                                            715/810
2023/0169967 A1 * 6/2023 Cronin .................. G06F 16/345
                                                            704/257

(Continued)

OTHER PUBLICATIONS

Lewis et al. "Retrieval-Augmented Generation for Knowledge-
Intensive NLP Tasks". 34th Conference on Neural Information
Processing Systems (NeurIPS 2020), Vancouver, Canada (Year:
2020).*

(Continued)

*Primary Examiner* — Jesse S Pullias
(74) *Attorney, Agent, or Firm* — Kilpatrick Townsend &
Stockton LLP

(57)                   ABSTRACT

A conversational branch data prediction system predicts
conversational branch data that can be used in automated
conversational services (e.g., "chatbots"). The conversa-
tional branch data prediction system predicts the conversa-
tional branch data based on interactions with multiple sec-
tions across multiple webpages of a website, such as sections
that include particular portions of text on webpages and omit
additional portions of the text. For each section, the con-
versational branch data prediction system determines a
vector embedding of text data in the section and a topic.
Based on event metrics data, the conversational branch data
prediction system identifies interactions with a particular
subset of the sections having a particular topic. A trained
machine-learning dialogue model identifies conversational
text data correlated with vector embeddings associated with
the particular subset of sections. The conversational branch
data prediction system provides the identified conversational
text data to an additional computing system.

20 Claims, 4 Drawing Sheets

(56) References Cited

U.S. PATENT DOCUMENTS

2024/0346256 A1* 10/2024 Qin ...................... G06F 40/216

OTHER PUBLICATIONS

Song, Haoyu, Generating Persona Consistent Dialogues by Exploiting Natural Language Inference, Harbin Institute of Technology, Heilongjiang Province, China, Mar. 22, 2021.
Song, Haoyu, Generate, Delete and Rewrite: A Three-Stage Framework for Improving Persona Consistency of Dialogue Generation, Harbin Institute of Technology, Heilongjiang, China, Jul. 5-10, 2020, pp. 5821-5831.
Ma, Zhengyi, One Chatbot Per Person: Creating Personalized Chatbots based on Implicit User Profiles, Gaoling School of Artificial Intelligence, Renmin University of China, Sep. 2, 2021.

* cited by examiner

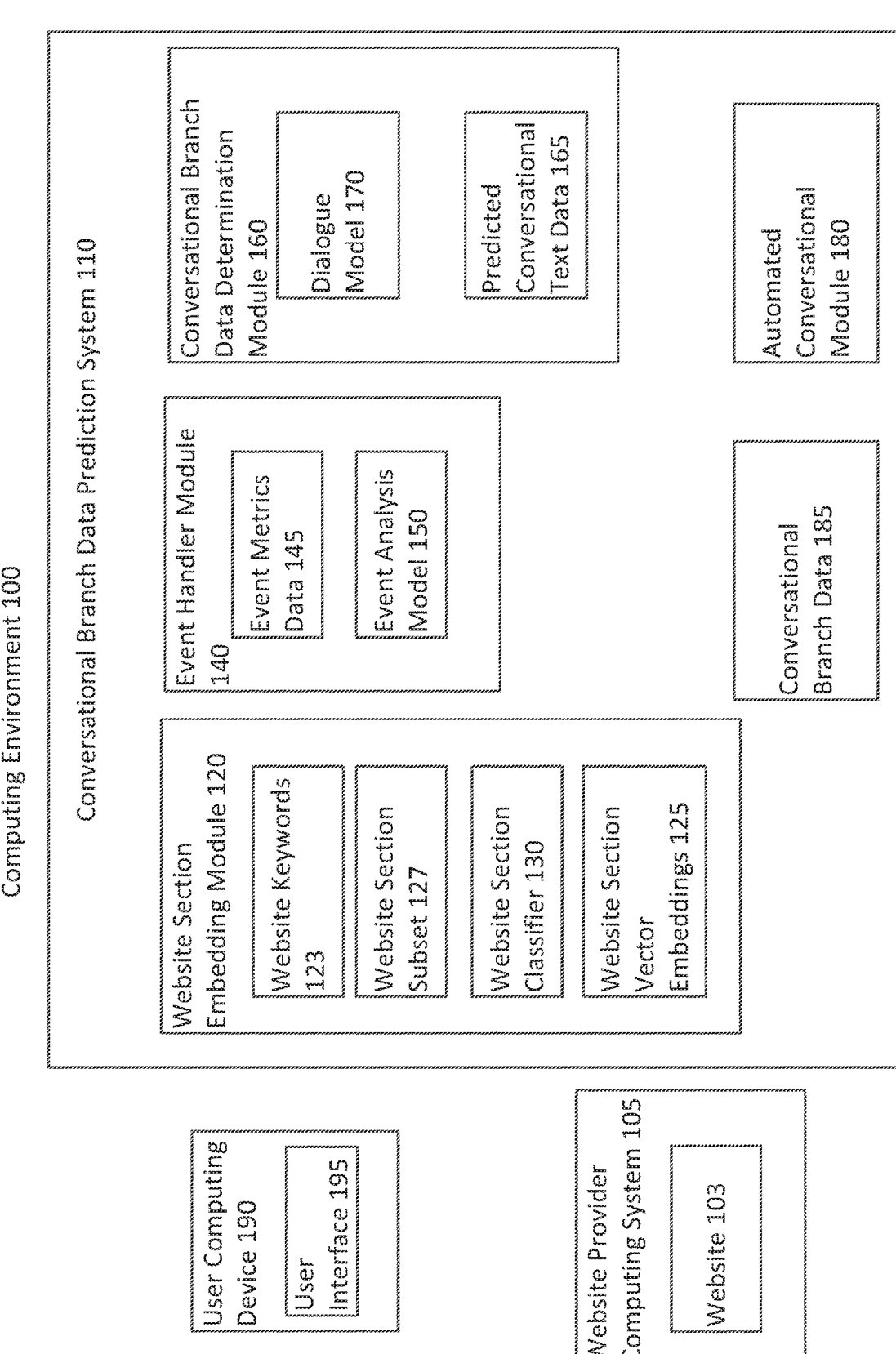

Computing Environment 100

Conversational Branch Data Prediction System 110

Conversational Branch Data Determination Module 160

Dialogue Model 170

Predicted Conversational Text Data 165

Event Handler Module 140

Event Metrics Data 145

Event Analysis Model 150

Website Section Embedding Module 120

Website Keywords 123

Website Section Subset 127

Website Section Classifier 130

Website Section Vector Embeddings 125

Automated Conversational Module 180

Conversational Branch Data 185

User Computing Device 190

User Interface 195

Website Provider Computing System 105

Website 103

FIG. 1

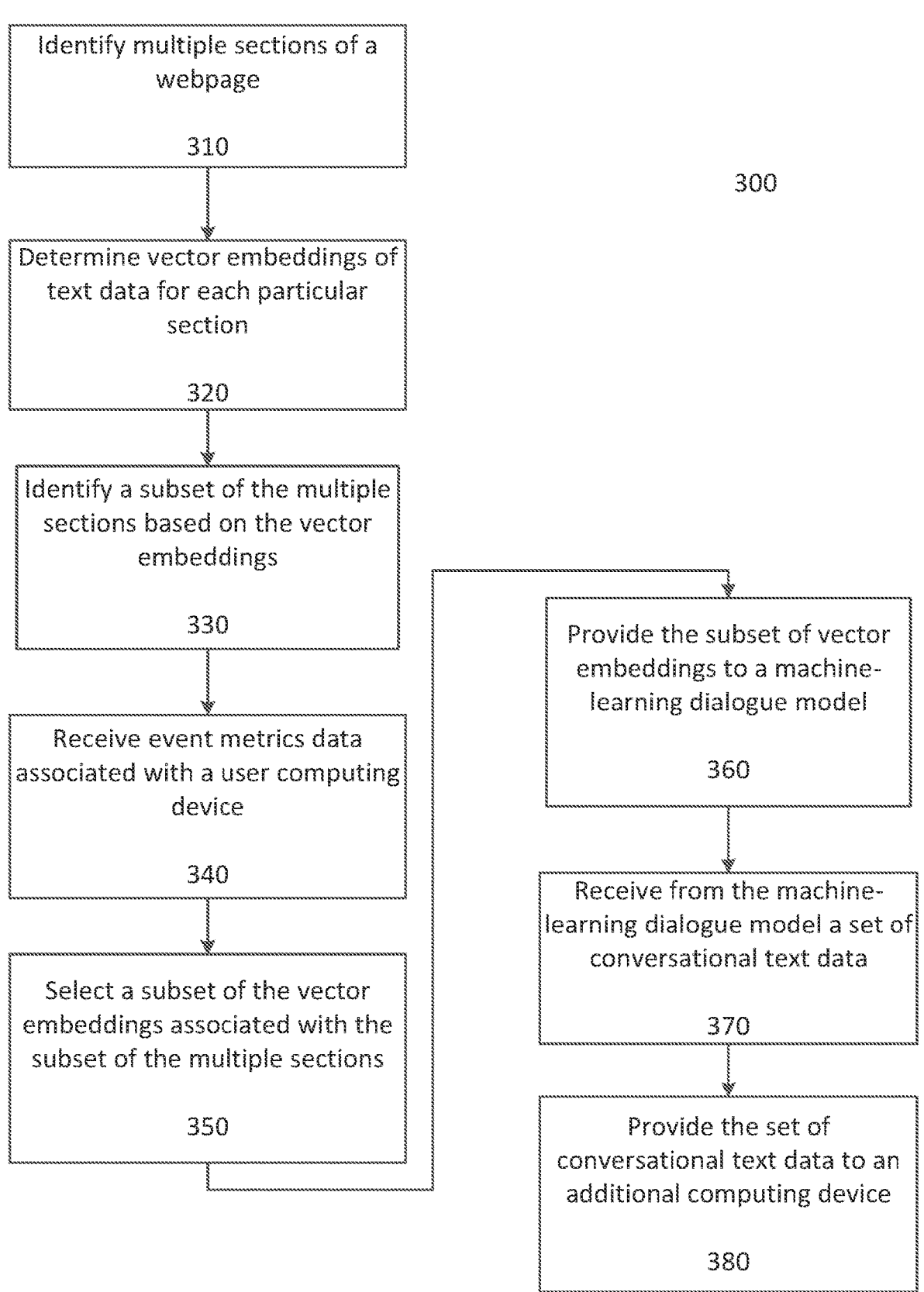

300

Identify multiple sections of a webpage

310

Determine vector embeddings of text data for each particular section

320

Identify a subset of the multiple sections based on the vector embeddings

330

Receive event metrics data associated with a user computing device

340

Select a subset of the vector embeddings associated with the subset of the multiple sections

350

Provide the subset of vector embeddings to a machine-learning dialogue model

360

Receive from the machine-learning dialogue model a set of conversational text data

370

Provide the set of conversational text data to an additional computing device

MACHINE-LEARNING TECHNIQUES TO DETERMINE AUTOMATED CONVERSATIONAL DATA

TECHNICAL FIELD

This disclosure relates generally to the field of machine learning, and more specifically relates to techniques for automated conversational data identification.

BACKGROUND

A user may visit a website to learn more about services or information provided by the website. In some cases, a website visitor may wish to use an automated conversational system (e.g., a chatbot) to quickly and accurately identify areas of the website that are of interest to the visitor. However, in some cases, a contemporary automated conversational system may have limited or inaccurate information about various areas of the website. In addition, the contemporary automated conversational system may be unable to accurately identify browsing activity by the visitor or may be able to identify browsing activity at a page level without additional granularity. For a visitor who is interested in website topics that are more specific than page-level organization, the contemporary automated conversational system may be unhelpful, providing insufficient or inaccurate information that is unrelated to the visitor's interests.

SUMMARY

According to certain embodiments, a conversational branch data prediction computing system predicts conversational branch data, such as conversational branch data that is used in automated conversational services (e.g., a "chatbot") provided by a computing system. The conversational branch data prediction computing system predicts the conversational branch data based on section-level interactions across multiple webpages of a website, such as sections that include particular portions of text on webpages and omit additional portions of the text on the webpages. An example of a section is a sentence of text included in a particular webpage, wherein the example section omits additional sentences included in the particular webpage. In some embodiments, the conversational branch data prediction computing system includes a website section embedding module and a conversational branch data determination module. The website section embedding module is configured for identifying multiple sections of multiple webpages in a website. For each identified section, the website section embedding module determines a vector embedding of text data that is included in the section. Based on the set of vector embeddings for the identified sections, the website section embedding module identifies, across multiple webpages in the website, a subset of the sections that have a particular topic.

In the example conversational branch data prediction computing system, the conversational branch data determination module is configured for selecting a subset of the vector embeddings that are associated with the subset of the sections having the particular topic. The conversational branch data determination module selects the subset of the vector embeddings based on received event metrics data that describes interactions of an additional computing device that accesses the subset of the sections having the particular topic. The conversational branch data determination module provides as inputs to a trained machine-learning dialogue model one or more of the event metrics data or the subset of the vector embeddings. Based on the received inputs, the trained machine-learning dialogue model identifies a set of conversational text data that is correlated with the subset of the vector embeddings. The conversational branch data prediction computing system provides the identified set of conversational text data to one or more additional computing devices.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where:

FIG. 1 is a block diagram depicting an example of a computing environment in which conversational branch data is identified, according to certain embodiments;

FIG. 3 is a flow chart depicting an example of a process for predicting conversational branch data, according to certain embodiments.

DETAILED DESCRIPTION

Figure 2:
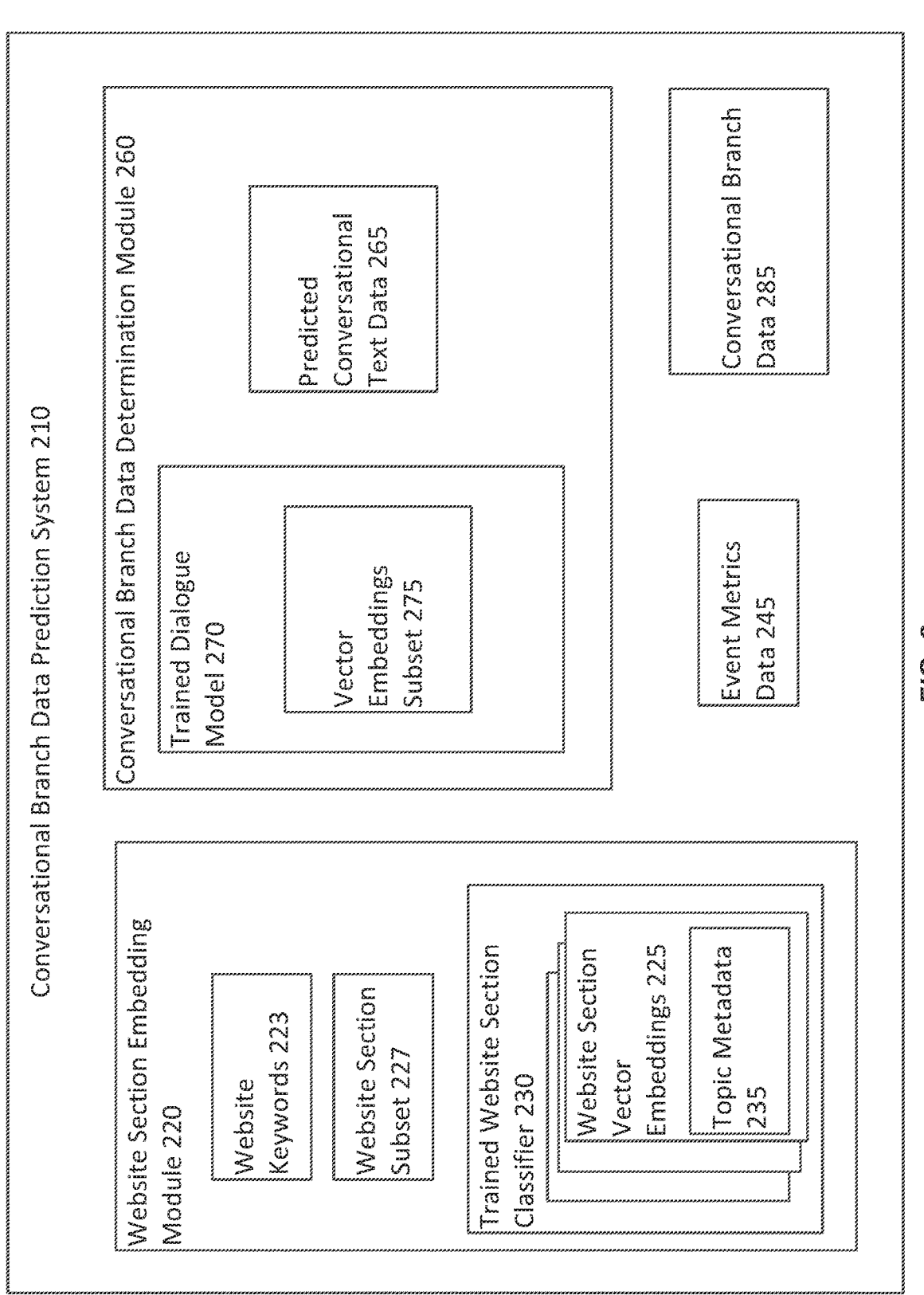
FIG. 2 is a diagram depicting an example of a conversational branch data prediction system that includes one or more machine-learning models, according to certain embodiments.

As discussed above, contemporary techniques for providing automated conversational services do not identify interests of a website visitor at section-level accuracy for a website. A contemporary automated conversational system can be configured to identify browsing activity by the visitor at a webpage level but can be unable to utilize section-level granularity to identify the browsing activity. Additionally or alternatively, a contemporary automated conversational system can lack section-level information about topics that are described by sections, i.e., portions, of webpages in the website. In some cases, a contemporary automated conversational system can be unable to identify multiple topics described by various sections in a particular webpage, or multiple topics described by sections that are frequently modified, such as a comments section of the particular webpage. The contemporary automated conversational system can be unable to accurately predict conversational data based on the multiple or frequently updated on the particular webpage.

Certain embodiments described herein provide for a conversational branch data prediction system that is configured to predict conversational branch data based on interactions with multiple sections of a website, such as interactions by a user computing device that accesses the multiple sections across multiple webpages of the website. In some cases, the conversational branch data prediction system predicts the conversational branch data with increased accuracy compared to a contemporary automated conversational system, such as by identifying conversational branch data that is associated with a particular subset of sections with which the user computing device interacted. Additionally or alternatively, the conversational branch data prediction system predicts the conversational branch data with increased speed compared to a contemporary automated conversational system, such as by identifying vector embeddings that describe text data or topics that are included in the particular subset of sections with which the user computing device interacted.

The following examples are provided to introduce certain embodiments of the present disclosure. A conversational branch data prediction system identifies sections in multiple webpages of a website. The sections include text data portions from the multiple webpages, such as a first section that includes text data from a first sentence on a particular webpage, a second section that includes text data from a second sentence on the particular webpage, a third section that includes text data from a menu option on the particular webpage, and additional sections that include additional portions of text data from the multiple webpages. The conversational branch data prediction system generates, for each particular section, a respective vector embedding that describes the text data in the particular section. Based on the vector embeddings, a website section embedding module in the conversational branch data prediction system identifies keywords or other metadata that are associated with the sections, such as a keyword indicating a topic of the text data in the particular section. Additionally or alternatively, the website section embedding module identifies one or more subsets of the sections that have particular topics. For example, the website section embedding module identifies a first website section subset including multiple sections that each have a first topic, such as "troubleshooting." The website section embedding module can generate or modify the vector embeddings associated with the sections of the first website section subset to indicate the topic "troubleshooting." In some cases, the conversational branch data prediction system generates additional vector embeddings that describe text data associated with conversational branch data, such as conversational branch text data that can be provided via an automated conversational system. The website section embedding module can generate or modify the additional vector embeddings to indicate a topic, such as a particular conversational branch data object that has the topic "troubleshooting."

The example conversational branch data prediction system receives event metrics data that describe interactions with the sections, such as interactions with multiple sections that are included in multiple respective webpages of the website. Based on the event metrics data, the conversational branch data prediction system determines that a user computing device has accessed, across the multiple webpages, one or more of the sections in the first website section subset having the topic "troubleshooting." In some cases, the conversational branch data prediction system determines that one or more of the sections accessed by the user computing device are included in additional website section subsets, such as a particular section that is included in the first website section subset having the first topic "troubleshooting" and a second website section subset having a second topic "email." Additionally or alternatively, the conversational branch data prediction system selects one or more particular subsets of the vector embeddings that are respectively associated with the particular website section subsets that are accessed by the user computing device. A conversational branch data determination module in the example conversational branch data prediction system selects a first vector embedding subset associated with the first website section subset and a second vector embedding subset associated with the second website section subset. In this example, the conversational branch data determination module includes a trained machine-learning dialogue model that selects or modifies the vector embedding subsets. The trained machine-learning dialogue model receives as inputs one or more of the event metrics data, the set of vector embeddings for each of the sections identified in the website, or the vector embedding subsets associated with the particular website section subsets accessed by the user computing device. Based on the received inputs, the trained machine-learning dialogue model identifies conversational text data that is correlated with the vector embedding subsets. In this example, based on identifying a correlation with the first and second vector embedding subsets, the trained machine-learning dialogue model identifies conversational text data associated with the first topic "troubleshooting" and the second topic "email." The conversational branch data prediction system provides the identified set of conversational text data to one or more additional computing devices, such as the user computing device.

Certain embodiments described herein provide improvements to computing systems configured to provide automated conversational services, such as automated conversational services provided to a visitor of a website. For example, a conversational branch data prediction system described herein predicts one or more conversational branch data objects by applying particular rules that identify relationships among multiple sections of multiple webpages in a website. In some cases, the application of these rules by the conversational branch data prediction system achieves an improved technological result in, for example, techniques for providing automated conversational services. For example, by applying these rules, the conversational branch data prediction system can improve efficiency of a computing environment, such as by identifying conversational branch text data with improved efficiency and providing the identified conversational branch text data to a user computing device more quickly, as compared to contemporary automated conversational systems. Additionally or alternatively, the conversational branch data prediction system provides improvements for functionality of a user interface, such as an automated conversational service provided via a website. For example, based on the described techniques, the conversational branch data prediction system can accurately and more efficiently identify information that is relevant for a user, such as a visitor to the website. In addition, the conversational branch data prediction system can present the identified information in a conversational format that is fast and easy for the user to comprehend, such as by providing the conversational branch text data identified via the described techniques.

Referring now to the drawings, FIG. 1 depicts an example of a computing environment 100 in which conversational branch data is identified using one or more trained machine-learning models. The computing environment 100 includes one or more of a conversational branch data identification computing system 110 and a user computing device 190. In some cases, the computing environment 100 includes a website provider computing system 105. Additionally or alternatively, the user computing device 190 includes a user interface 195, by which a user of the user computing device 190 may provide or receive data in the computing environment 100. For example, the user could access one or more websites, such as a website 103 hosted (or otherwise provided) by the website provider computing system 105, via the user interface 195 and the user computing device 190. In some cases, the conversational branch data identification computing system 110, the user computing device 190, and the website provider computing system 105 are configured to communicate via one or more computing networks, such as a wide-area network, a local-area network, or other suitable types of computing networks.

In FIG. 1, the conversational branch data prediction system 110 includes one or more of a website section embedding module 120, an event handler module 140, a conversational branch data determination module 160, or an automated conversational module 180. In some cases, the automated conversational module 180 is configured to conduct a conversation with one or more website visitors, such as the user who accesses the website 103 via the user computing device 190. In FIG. 1, the conversational branch data prediction system 110 is depicted as including the automated conversational module 180, but other implementations are possible. For example, the conversational branch data prediction system 110 could provide or receive conversational branch data associated with an automated conversational module included in the website provider computing system 105. As an additional example, a conversational branch data prediction system could exchange conversational branch data with an additional computing system, such as an additional computing system that is configured to provide automated conversational services for website visitors (e.g., visitors of the website 103).

In the computing environment 100, the conversational branch data prediction system 110 generates or otherwise receives a set of one or more keywords describing the website 103, such as a set of website keywords 123. In some cases, the conversational branch data prediction system 110 receives the website keywords 123 from an additional computing system, such as the website provider computing system 105. In some cases, the conversational branch data prediction system 110 generates the website keywords 123, such as keyword generation via a website analysis module that is included in (or otherwise in communication with) the conversational branch data prediction system 110. For example, the conversational branch data prediction system 110 could generate the website keywords 123 based on text analysis of multiple pages or sections that are included in the website 103.

In the conversational branch data prediction system 110, the website section embedding module 120 includes one or more trained machine-learning models, such as a website section classification machine-learning model (or "website section classifier") 130. Additionally or alternatively, the website section classifier 130 is trained to generate website section vector embeddings 125. For example, the website section classifier 130 is trained to generate, for each section of the website 103, a respective vector embedding that is included in the website section vector embeddings 125. In the website section vector embeddings 125, each respective vector embedding describes one or more features of the associated section of the website 103. As used herein, a section of a website refers to text data that is included in a webpage of a website. For a particular website section, the text data can be a sentence, a paragraph, a text caption of an image, alternative text (e.g., "alt-text") that describes an image, a text option in a menu, a text option in an expandable webpage region (e.g., "drop-down" webpage regions), or any other text data that is included in a particular section of a webpage in a website.

In some cases, the website section classifier 130 is trained to generate the website section vector embeddings 125 based on the website keywords 123. For example, the website section classifier 130 classifies each particular section (e.g., sentences, paragraphs, expandable regions) as being associated with a particular keyword (or subset of keywords) from the website keywords 123. Additionally or alternatively, the website section classifier 130 generates, for each particular section, a respective vector embedding that describes the text of the particular section. In some cases, the respective vector embedding includes metadata that describes the associated keyword. In the conversational branch data prediction system 110, the website section classifier 130 can generate or modify the website section vector embeddings 125 in response to receiving a data object, such as a data object that includes the website keywords 123, descriptive data indicating the website 103, or alert data indicating a modification (e.g., an update) to one or more of the website keywords 123 or the website 103. In some cases, the website section classifier 130 can generate or modify the website section vector embeddings 125 at a particular time, such as a daily (or other suitable time period) update to the website section vector embeddings 125. Additionally or alternatively, the conversational branch data prediction system 110 stores (or otherwise accesses) the website section vector embeddings 125.

In FIG. 1, the conversational branch data prediction system 110 identifies one or more subsets of the multiple sections of the website 103. In some cases, the conversational branch data prediction system 110 identifies each particular subset based on a keyword that is associated with the sections included in the particular subset. For example, the website section embedding module 120 identifies a website section subset 127, in which each included section is associated with a particular keyword (or a particular group of keywords). In some cases, the website section subset 127 includes sections that are identified from multiple webpages of the website 103. For example, each sentence, paragraph, or other section included in the website section subset 127 is associated with a particular keyword, such as a keyword "troubleshooting." Additionally or alternatively, the website section embedding module 120 (or another component of the conversational branch data prediction system 110) determines that each section included in the website section subset 127 has a particular topic, such as a topic that is indicated by the associated keyword. In the above example of the keyword "troubleshooting," the website section embedding module 120 can determine that each sentence, paragraph, or other section included in the website section subset 127 includes information that describes a topic of troubleshooting. Continuing with this example, the website section embedding module 120 can identify the website section subset 127 as a group of multiple sections across multiple webpages in the website 103, each section having the topic of troubleshooting.

In the conversational branch data prediction system 110, the event handler module 140 analyzes event data, such as event data that describes interactions with one or more websites. For example, the conversational branch data prediction system 110 receives, from one or more of the user computing device 190 or the website provider computing system 105, event data that describes interactions of the user computing device 190 with the website 103. The event data can describe, for example, interactions of the user computing device 190 with one or more particular sections of one or more webpages in the website 103, such as one or more sections included in the website section subset 127. For example, the event handler module 140 can receive event data that describes one or more of view focus data indicating an amount of time spent viewing (e.g., via a display of the user interface 195) a particular section, click data indicating a mouse click (or other input action) on a particular section, input text data indicating keyboard input (or from another input device) in a search bar or other website region, or other types of website interactions. Additionally or alternatively, the event handler module 140 generates event metrics data 145 based on the received event data. In some cases, the event metrics data 145 indicates interactions of the user computing device 190 with one or more sections included in the website section subset 127. For example, the event handler module 140 can include one or more trained machine-learning models, such as an event analysis machine-learning model (or "event analysis model") 150. Additionally or alternatively, the event analysis model 150 is trained to generate the event metrics data 145. For example, the event analysis model 150 is trained to apply supervised or unsupervised machine-learning techniques to analyze the event data received by the conversational branch data prediction system 110. Additionally or alternatively, the event analysis model 150 generates (or modifies) the event metrics data 145 based on the applied analysis techniques, such as modifying the event metrics data 145 to describe a timespent metric, a click metric, a search metric, or other metrics describing analyzed characteristics of the received event data. In some cases, the event analysis model 150 generates (or modifies) the event metrics data 145 to indicate interactions with one or more sections in the website section subset 127.

In FIG. 1, the conversational branch data prediction system 110 is described as generating the event metrics data 145 via one or more of the event handler module 140 or event analysis model 150, but other implementations are possible. For example, the conversational branch data prediction system 110 could receive additional event metrics data from the website provider computing system 105. As an additional example, a conversational branch data prediction system could receive event metrics data from an additional computing system, such as a streaming computing platform (or other suitable computing system) that is configured to receive, process, and/or analyze event data. In some cases, the additional computing system, such as the example streaming computing platform, may be configured to generate event metrics data based on large volumes of event data for one or more websites, such as large volumes of event data involving hundreds of thousands or millions of browsing sessions with respective user computing devices. In some cases, the additional computing system, such as the example streaming computing platform, may be configured to generate event metrics data in real-time (e.g., without delay noticeable by humans), such as real-time event metrics data that is generated within 1-2 seconds upon receiving event data.

In the conversational branch data prediction system 110, the conversational branch data determination module 160 receives one or more of the event metrics data 145 or the website section vector embeddings 125. Additionally or alternatively, the conversational branch data determination module 160 accesses conversational branch data 185. The conversational branch data 185 includes multiple data objects describing conversational text data, such as text data that is used to initiate or continue a conversation conducted via the automated conversational module 180. In some cases, the conversational branch data 185 can describe multiple conversation possibilities, such as a set of data objects that describe a relatively large variety (e.g., several dozen or hundreds) of conversational branches that are associated with various topics, visitor requests, conversation outcomes, or other conversation possibilities. Based on the event metrics data 145 and the website section vector embeddings 125, the conversational branch data determination module 160 identifies a set of the conversational text data, such as an identified set of the conversational text data that is correlated with one or more of the event metrics data 145 or the website section vector embeddings 125.

In some cases, the conversational branch data determination module 160 includes one or more trained machine-learning models, such as a trained machine-learning dialogue model (or "dialogue model") 170. Additionally or alternatively, the dialogue model 170 is trained to predict, based on the event metrics data 145, a subset of keywords (or other metadata) associated with the website section vector embeddings 125. In some cases, the dialogue model 170 is trained to predict conversational branch text data based on the predicted subset of keywords, such as a subset of predicted conversational text data 165. For example, the dialogue model 170 determines a subset of particular vector embeddings, from the website section vector embeddings 125, that is associated with one or more website sections indicated by the event metrics data 125. Additionally or alternatively, the dialogue model 170 identifies one or more keywords that are likely to be of interest to the user of the user computing device 190, such as the keywords that are included in (or otherwise associated with) the determined subset of particular vector embeddings. Based on the identified keywords, the dialogue model 170 identifies one or more conversational branch data objects from the conversational branch data 185, such as one or more data objects that describe conversational text data (e.g., questions, offers to assist) correlated with the identified keywords. In some cases, the conversational branch data determination module 160 receives the subset of predicted conversational text data 165 from the dialogue model 170. Additionally or alternatively, the conversational branch data determination module 160 provides the subset of predicted conversational text data 165 to the automated conversational module 180. In some cases, the conversational branch data determination module 160 provides the subset of predicted conversational text data 165 to one or more additional computing systems, such as the website provider computing system 105 or an additional computing system configured to provide automated conversational services for visitors of the website 103.

As an example, the event metrics data 125 could indicate that the user computing device 190 accessed a dozen webpages of the website 103 and spent a threshold amount of time viewing particular sections (e.g., particular sentences) of the dozen webpages. Based on this example of the event metrics data 145, the dialogue model 170 can determine the respective vector embeddings associated with the particular sections that were viewed for the threshold amount of time. Continuing with this example, the dialogue model 170 can determine that the respective vector embeddings have keywords (or other metadata), such as keywords describing "troubleshooting," "email," and "mobile device." In this example, the dialogue model 170 can predict one or more website section topics that are of interest to the user of the user computing device 190, such as topics related to troubleshooting a mobile email application. The dialogue model 170 can identify, from the conversational branch data 185, the subset of predicted conversational text data 165 that includes conversational topics related to the example of troubleshooting a mobile email application. Based on the example prediction received from the dialogue model 170, the conversational branch data determination module 160 provides the example subset of predicted conversational text data 165 to the automated conversational module 180. The automated conversational module 180 can initiate (or continue) a conversation with the user of the user computing device 190 using the example subset of predicted conversational text data 165. For example, the automated conversational module 180 could provide, to the user computing device 190, particular conversational text data that describes troubleshooting steps for a mobile email application.

In some embodiments, a conversational branch data prediction system generates one or more predicted conversational branch data objects. Additionally or alternatively, the predicted conversational branch data objects can be customized for a particular visitor who views particular sections (or sub-sections) included in one or more webpages in a website. In some cases, the conversational branch data prediction system identifies the predicted conversational branch data objects in response to event metrics data or other data that describe the particular sections of the webpages. In some cases, the conversational branch data prediction system includes one or more machine-learning models that have a particular configuration for identifying sections of a webpage that may be of relatively high interest for the particular visitor. Additionally or alternatively, the configuration of the one or more machine-learning models can provide the predicted conversational branch data objects with improved accuracy, as compared to a contemporary computing system that provides conversational data based on a webpage without consideration of sections included in the webpage. In some cases, the one or more machine-learning models in the conversational branch data prediction system are configured to identify one or more keywords that are associated with a particular section of a webpage. Additionally or alternatively, the one or more machine-learning models in the conversational branch data prediction system are configured to provide the predicted conversational branch data objects based on the identified keywords associated with the particular section.

FIG. 2 depicts an example of a conversational branch data prediction system 210 that includes one or more trained machine-learning models. In FIG. 2, the one or more trained machine-learning models are configured to generate one or more predicted conversational branch data objects based on keywords (or other metadata) that are associated with particular sections of webpages in a website. For example, the conversational branch data prediction system 210 could be configured to exchange data with one or more additional computing systems, such as the user computing device 190 or the website provider computing system 105 described in regard to FIG. 1. In some cases, the conversational branch data prediction system 210 is configured to generate or otherwise receive a set of keywords that are associated with a website, such as website keywords 223. Additionally or alternatively, the conversational branch data prediction system 210 is configured to generate or otherwise receive event metrics data 245, such as event metrics data generated by a system component (e.g., the event handler module 140) or received from an additional computing system (e.g., a streaming computing platform).

In FIG. 2, the conversational branch data prediction system 210 includes (or otherwise is configured to access) conversational branch data 285. In some cases, the conversational branch data 285 includes multiple data objects that describe multiple conversation possibilities, such as a set of data objects that describe a relatively large variety (e.g., several dozen or hundreds) of conversational branches that are associated with various conversation possibilities. Additionally or alternatively, the conversational branch data prediction system 210 is configured to generate the predicted conversational branch data objects based on data objects from the conversational branch data 285. For example, the conversational branch data prediction system 210 can select, from the conversational branch data 285, a particular conversational branch data object that is predicted to have a relatively high relevance for a visitor who is interacting with a website via a user computing device. In some cases, the conversational branch data prediction system 210 is configured to provide the predicted conversational branch data objects, or corresponding data, to one or more additional computing systems. For example, the conversational branch data prediction system 210 could provide text data that corresponds to a predicted conversational branch data object to one or more of a user computing device, a website provider computing system, a computing system that is configured to provide automated conversational services (e.g., a chatbot configured to communicate with a visitor of a website), or other types of additional computing systems that could utilize predicted conversational branch data.

In FIG. 2, the conversational branch data prediction system 210 includes one or more of a website section embedding module 220 or a conversational branch data determination module 260. Additionally or alternatively, each of the website section embedding module 220 and the conversational branch data determination module 260 includes at least one trained machine-learning model. For example, the website section embedding module 220 includes a trained website section classification machine-learning model (or "trained website section classifier") 230. Additionally or alternatively, the conversational branch data determination module 260 includes a trained machine-learning dialogue model (or "trained dialogue model") 270. In the conversational branch data prediction system 210, each of the trained website section classifier 230 and the trained dialogue model 270 is configured to generate one or more data objects that are utilized by the conversational branch data prediction system 210 for predicting conversational branch data. In some cases, one or more of the trained website section classifier 230 or the trained dialogue model 270 is configured to generate the data objects based on additional data received as an input. For example, the trained website section classifier 230 can be configured to generate a set of website section vector embeddings 225 based on the set of website keywords 223. Additionally or alternatively, the trained dialogue model 270 can be configured to generate (or otherwise identify) predicted conversational text data 265 based on one or more of the set of website section vector embeddings 225 or the event metrics data 245.

In FIG. 2, the trained website section classifier 230 is configured to generate one or more vector embeddings, such as the set of website section vector embeddings 225. In some cases, the trained website section classifier 230 identifies each vector embedding in the website section vector embeddings 225 based on a respective section of a website. For example, the trained website section classifier 230 receives, as an input, the website keywords 223. Based on the input set of keywords, the trained website section classifier 230 classifies each sentence (or other suitable section) on one or more webpages of the website. Additionally or alternatively, the trained website section classifier 230 generates, for each particular sentence, a respective vector embedding that is included in the website section vector embeddings 225. In some cases, the trained website section classifier 230 generates topic metadata 235 that is included in (or otherwise associated with) the website section vector embeddings 225. For example, each vector embedding in the website section vector embeddings 225 can include (or be otherwise associated with) a respective portion of the topic metadata 235.

In some cases, the topic metadata 235 includes information that describes each vector embedding in the website section vector embeddings 225. Examples of information included in the topic metadata 235 can include one or more of a keyword or subset of keywords by which a particular vector embedding is classified (e.g., a keyword from the website keywords 223), a tag that describes a characteristic of a particular vector embedding, or other types of information that can describe a vector embedding. In some cases, the trained website section classifier 230 is trained based on one or more suitable training techniques, such as supervised or unsupervised classification training techniques. In some cases, supervised and unsupervised classification techniques can be used for training. An example of a supervised classification technique that is suitable for inference includes an XGBoost classifier, but other types of supervised classification techniques can be used. Examples of unsupervised classification techniques include k-means clustering and cosine similarity, but other types of unsupervised classification techniques can be used. In some cases, a topic modeling classification technique can be used for training, such as topic modeling that is based on one or more keywords from the website keywords 223.

In some embodiments, the trained website section classifier 230 classifies and identifies respective vector embeddings for multiple types of sections on a particular website. Additionally or alternatively, the trained website section classifier 230 classifies and identifies respective vector embeddings for multiple overlapping sections that are included in the particular website. In some cases, an overlap characteristic can indicate overlap among metadata portions that are associated with overlapping sections. For example, the trained website section classifier 230 could classify each sentence on each webpage in the website, and modify (or generate) the website section vector embeddings 225 to include respective vector embeddings for each sentence. In addition to the respective vector embeddings for the sentences, the trained website section classifier 230 could classify each paragraph on each webpage in the website, and modify (or generate) the website section vector embeddings 225 to include additional respective vector embeddings for each paragraph. In some cases, the trained website section classifier 230 could generate (or modify) the topic metadata 235 to indicate an overlap characteristic of the respective vector embeddings for the sentences and the additional respective vector embeddings for the paragraphs. The overlap characteristics could be indicated, for instance, by a particular tag that is included in the topic metadata 235 (or particular portions of the topic metadata 235 that are associated with the respective vector embeddings for the sentences and paragraphs). As an example, the trained website section classifier 230 could generate, for a particular paragraph, a vector embedding and metadata portion indicating that the particular paragraph relates to troubleshooting steps for email. Additionally or alternatively, the trained website section classifier 230 could generate an additional vector embedding and metadata portion for each sentence in the particular paragraph, such as respective vector embeddings and metadata portions indicating that a first sentence relates to desktop email applications and a second sentence relates to mobile email applications. Continuing with this example, the trained website section classifier 230 could generate (or modify) the vector embeddings and metadata portions for the particular paragraph, the first sentence, and the second sentence to indicate an overlap characteristic, e.g., the paragraph and sentences are overlapping sections. Additionally or alternatively, the overlap characteristic could indicate an overlap of the metadata portions describing "troubleshooting" for the particular paragraph and additional metadata describing "desktop email applications" and "mobile email applications" for the first and second sentences. Examples of overlapping sections can include a paragraph that includes multiple sentences, an expandable region that includes multiple paragraphs or sentences, a menu that includes multiple menu options, or other types of sections that can overlap within a webpage of a website.

In the conversational branch data prediction system 210, the website section embedding module 220 (or another component of the conversational branch data prediction system 210) identifies one or more subsets of multiple sections of a website, such as sections of the website associated with the website keywords 223. In some cases, the conversational branch data prediction system 210 identifies each particular subset based on a keyword that is associated with the multiple sections included in the particular subset. For example, the website section embedding module 220 identifies a website section subset 227, in which each included section is associated with a particular keyword (or multiple keywords) from the website keywords 223. In some cases, the website section subset 227 includes sections that are identified across multiple webpages included in the website. Additionally or alternatively, the website section embedding module 220 determines that each section included in the website section subset 227 has a particular topic, such as a topic that is indicated by the associated keyword. In some cases, the topic metadata 235 indicates that one or more particular vector embeddings from the website section vector embeddings 225 are included in the website section subset 227, such as particular vector embeddings that have the topic that is determined for the website section subset 227.

In FIG. 2, the trained dialogue model 270 is configured to select or modify a subset of the vector embeddings from the set of website section vector embeddings 225, such as a vector embeddings subset 275. In some cases, the trained dialogue model 270 receives one or more of the website section vector embeddings 225 or the vector embeddings subset 275 as an input, such as from another component of the conversational branch data prediction system 210. The trained dialogue model 270 could modify the received vector embeddings subset 275, such as based on the techniques described herein. Additionally or alternatively, the trained dialogue model 270 receives as an input the website section vector embeddings 225, from which the trained dialogue model 270 selects one or more particular vector embeddings for the vector embeddings subset 275. In some cases, the trained dialogue model 270 receives data indicating the website section subset 227, such as a portion of the topic metadata 235 that is included in particular vector embeddings associated with the sections of the website section subset 227.

In some embodiments, the trained dialogue model 270 identifies each vector embedding in the vector embeddings subset 275 based on the event metrics data 245, the website section vector embeddings 225, or a combination of the event metrics data 245 with the website section vector embeddings 225. For example, the trained dialogue model 270 receives, as inputs, one or more of the event metrics data 245 or the website section vector embeddings 225. Based on the received inputs, the trained dialogue model 270 identifies one or more vector embeddings associated with website sections accessed via a user computing device, such as particular paragraphs, sentences, expandable regions, or other sections of one or more pages on the website. In some cases, the trained dialogue model 270 selects the one or more vector embeddings based on a determination that the event metrics data 245 indicates viewing or other interactions with the associated website sections, such as a particular event metric indicating a click interaction, a threshold viewing time (e.g., by a browser window in a user computing device), or other type of event metric indicating interactions with the website sections. Additionally or alternatively, the trained dialogue model 270 selects the one or more vector embeddings from the website section vector embeddings 225 based on an indication (e.g., in the topic metadata 235) that the website section subset 227 includes multiple sections that have a particular topic. In some cases, the trained dialogue model 270 selects multiple vector embeddings for a particular website section, such as multiple vector embeddings that include metadata indicating an overlap characteristic (e.g., selecting vector embeddings for a sentence, a paragraph that includes the sentence, and one or more additional sentences included in the paragraph). Based on the selection, the trained dialogue model 270 generates or modifies the vector embeddings subset 275 to include the selected vector embedding (or multiple vector embeddings). In some cases, the trained dialogue model 270 is trained based on one or more suitable training techniques, such as statistical, supervised, or unsupervised classification training techniques. Example types of machine-learning dialogue models for the trained dialogue model 270 can include a model that utilizes XGBoost classification techniques or a model that utilizes cosine similarity techniques, but other types of machine-learning dialogue models, or combinations of models, may be suitable.

In some cases, the trained dialogue model 270 receives additional data as an additional input, such as additional data identified by the conversational branch data prediction system 210 or received from one or more additional computing devices (e.g., the user computing device 190, the website provider computing system 105, a computing system configured to provide automated conversational services). Examples of additional input data can include conversational text data received from a user computing device via an automated conversational service, device data indicating a characteristic of a user computing device (e.g., device type, IP address), visitor data indicating a characteristic of a visitor profile (e.g., profile name, account type, user device used for access), activity history data indicating additional interactions of a user computing device with the website or an additional website, search data received from a user computing device via the website or an additional website, or other types of input data that can be utilized by the trained dialogue model 270. In some cases, the trained dialogue model 270 identifies one or more vector embeddings in the vector embeddings subset 275 based on a combination of the event metrics data 245, the website section vector embeddings 225, and the additional input data.

In the conversational branch data prediction system 210, the trained dialogue model 270 identifies one or more relationships among the vector embeddings subset 275 and the conversational branch data 285. Additionally or alternatively, the trained dialogue model 270 identifies the relationships based on the topic metadata 235 that is generated for the website section vector embeddings 225. For example, the trained dialogue model 270 determines that a particular vector embedding in the website section vector embeddings 225 includes metadata that indicates a particular keyword (or multiple keywords). Additionally or alternatively, the trained dialogue model 270 determines that a particular conversational branch data object from the conversational branch data 285 is associated with the particular keyword. For example, the particular conversational branch data object could include (or be associated with) text data, metadata, or other forms of data that include the particular keyword. In some cases, the trained website section classifier 230 classifies and identifies respective metadata (e.g., vector embeddings) for one or more data objects in the conversational branch data 285 based on the set of website keywords 223, but other implementations are possible, such as keywords or other metadata for the conversational branch data 285 that are determined by an additional computing system.

Based on the determination that the particular keyword is associated with the particular vector embedding and the particular conversational branch data object, the trained dialogue model 270 identifies a relationship between the particular vector embedding and the particular conversational branch data object. Additionally or alternatively, the trained dialogue model 270 generates or modifies the predicted conversational text data 265 responsive to identifying the relationship, such as by including the particular conversational branch data object, or corresponding text data, in the predicted conversational text data 265. In some cases, the predicted conversational text data 265 includes text data for a subset of the data objects from the conversational branch data 285 that are predicted to have a relatively high relevance to the website sections indicated by the event metrics data 245, e.g., sections displayed or otherwise interacted with via a user computing device of a website visitor. In FIG. 2, the conversational branch data prediction system 210 provides the predicted conversational text data 265 to one or more additional computing systems, such as a user computing device, a website provider computing system, a computing system configured to provide automated conversational services, or other types of additional computing systems that could utilize the predicted conversational text data 265.

In some cases, the conversational branch data prediction system 210 can generate the predicted conversational text data 265 based on the website section vector embeddings 225 with improved speed or accuracy, as compared to a contemporary system that utilizes information related to a webpage without considering sections of the webpage. For example, based on one or more of the website section vector embeddings 225 or the topic metadata 235, the trained dialogue model 270 can rapidly identify relationships among the conversational branch data 285 and website sections associated with the vector embeddings subset 275, such as relationships among particular sections and conversational branch data objects that are associated with particular keywords (or other metadata) described by the topic metadata 235. In some cases, the trained dialogue model 270 accurately generates the predicted conversational text data 265 by utilizing one or more particular data objects, such as the website section vector embeddings 225, the topic metadata 235, the predicted conversational text data 265, the conversational branch data 285, or other data objects generated or modified by the conversational branch data prediction system 210. In some cases, the conversational branch data prediction system 210 provides the subset of predicted conversational text data 265 to one or more additional computing systems, such as to a website provider computing system associated with the website, a user computing device, or an additional computing system configured to provide automated conversational services for visitors of the website.

FIG. 3 is a flow chart depicting an example of a process 300 for predicting conversational branch data. In some embodiments, such as described in regards to FIGS. 1-2, a computing device executing a conversational branch data prediction system implements operations described in FIG. 3, by executing suitable program code. For illustrative purposes, the process 300 is described with reference to the examples depicted in FIGS. 1-2. Other implementations, however, are possible.

At block 310, the process 300 involves identifying, such as by a conversational branch data prediction system, one or more sections of at least one webpage in a website. In some cases, the conversational branch data prediction system receives, such as from an additional computing system, data that identifies multiple sections of multiple webpages that are included in the website. Additionally or alternatively, the conversational branch data prediction system generates data that identifies the multiple sections of the multiple webpages in the website. For example, the conversational branch data prediction system 110 can receive, such as from the website provider computing system 105, data that identifies multiple sections of the website 103. Additionally or alternatively, the conversational branch data prediction system 110 can generate data that identifies the multiple sections of the website 103, such as by analyzing text that is included in the website 103 to identify sections.

At block 320, the process 300 involves determining, by the conversational branch data prediction system, one or more vector embeddings for the sections of the website. In some cases, each vector embedding is determined based on text that is included in a respective section. Additionally or alternatively, each vector embedding includes (or is otherwise associated with) metadata that describes the vector embedding, such as a keyword. In some cases, a website section embedding module included in the conversational branch data prediction system generates one or more of the vector embeddings or the metadata. For example, the website section embedding module 120 generates the website section vector embeddings 125 based on text of respective sections in the website 103. Additionally or alternatively, the website section embedding module 220 generates the website section vector embeddings 225 and the topic metadata 235, which indicates one or more keywords associated with each particular vector embedding in the website section vector embeddings 225.

At block 330, the process 300 involves identifying, by the conversational branch data prediction system, one or more subsets of the sections in the website, such as a subset of website sections that include information (e.g., text data) describing a particular topic. Additionally or alternatively, one or more of the website section subsets includes multiple sections identified across multiple webpages in the website. In some cases, the website section embedding module included in the conversational branch data prediction system generates each particular website section subset by identifying one or more sections that have a particular topic. For example, the website section embedding module 220 generates the website section subset 227 responsive to identifying one or more sections that have a particular topic, such as a topic that is described by the topic metadata 235 for each of the identified sections.

At block 340, the process 300 involves receiving, by the conversational branch data prediction system, event metrics data that is associated with at least one additional computing device, such as a user computing device. In some cases, the event metrics data indicates interactions of the additional computing device with the website, such as interactions with the website via the user computing device. Additionally or alternatively, the event metrics data indicates interactions with one or more particular sections of the website, such as a particular section that is included in a website section subset having a particular topic. In some cases, an event handler module in the conversational branch data prediction system generates (or modifies) the event metrics data. For example, the event handler module 140 can generate the event metrics data 145. Additionally or alternatively, the conversational branch data prediction system receives the event metrics data from one or more additional computing systems, such as a streaming computing platform configured to generate event metrics data.

At block 350, the process 300 involves selecting, by the conversational branch data prediction system, a subset of the vector embeddings, such as a subset of the vector embeddings that are associated with a particular website section subset having a particular topic. Additionally or alternatively, the vector embedding subset is selected based on the event metrics data, such as by identifying one or more vector embeddings that are associated with sections with which the additional computing device has interacted. In some cases, a conversational branch data determination module included in the conversational branch data prediction system selects one or more of the vector embeddings for inclusion in the vector embedding subset. For example, the conversational branch data determination module 260 generates or modifies the vector embeddings subset 275, such as by selecting one or more vector embeddings from the website section vector embeddings 225 for inclusion in the vector embeddings subset 275.

At block 360, the process 300 involves providing, by the conversational branch data prediction system, the selected subset of the vector embeddings to a machine-learning dialogue model, such as a trained dialogue model that is included in the conversational branch data determination module of the conversational branch data prediction system. In some cases, the trained dialogue model receives the selected subset of the vector embeddings as an input, such as from the conversational branch data determination module or another component of the conversational branch data prediction system. Additionally or alternatively, the trained dialogue model receives one or more of the event metrics data or the website section vector embeddings as inputs. In some cases, the trained dialogue model generates or modifies the selected subset of the vector embeddings, such as by identifying one or more vector embeddings in the selected subset of the vector embeddings based on the event metrics data, the website section vector embeddings, or a combination thereof. For example, the trained dialogue model 270 can identify one or more vector embedding in the vector embeddings subset 275 based on a combination of the event metrics data 245 with the website section vector embeddings 225. Additionally or alternatively, the trained dialogue model 270 can identify the one or more vector embeddings in the vector embeddings subset 275 based on an indication that one or more sections having a particular topic, such as at least one section in the website section subset 227, have been accessed by a user computing device.

At block 370, the process 300 involves receiving, by the conversational branch data prediction system, a set of conversational text data, such as predicted conversational text data that is identified by the trained dialogue model. Additionally or alternatively, the set of conversational text data is correlated with the selected subset of the vector embeddings. In some cases, the trained dialogue model (or another component of the conversational branch data prediction system) generates the set of conversational text data by identifying, from conversational branch data, particular conversational branch data objects (or corresponding text data) that are associated with the selected subset of the vector embeddings. For example, the trained dialogue model 270, the conversational branch data determination module 260, or another component of the conversational branch data prediction system 210 generates the predicted conversational text data 265 by identifying one or more data objects from the conversational branch data 285 that are correlated with the vector embeddings subset 275.

At block 380, the process 300 involves providing, by the conversational branch data prediction system, the set of conversational text data to one or more additional computing systems, such as to a computing system configured to provide automated conversational services. Additionally or alternatively, the conversational branch data determination module provides the set of conversational text data to one or more additional components of the conversational branch data prediction system. For example, the conversational branch data determination module 160 provides the predicted conversational text data 165 to the automated conversational module 180. Additionally or alternatively, the conversational branch data prediction system 210 provides the subset of predicted conversational text data 265 to one or more additional computing systems, such as to a website provider computing system associated with the website, a user computing device, or an additional computing system configured to provide automated conversational services for visitors of the website.

Figure 4:
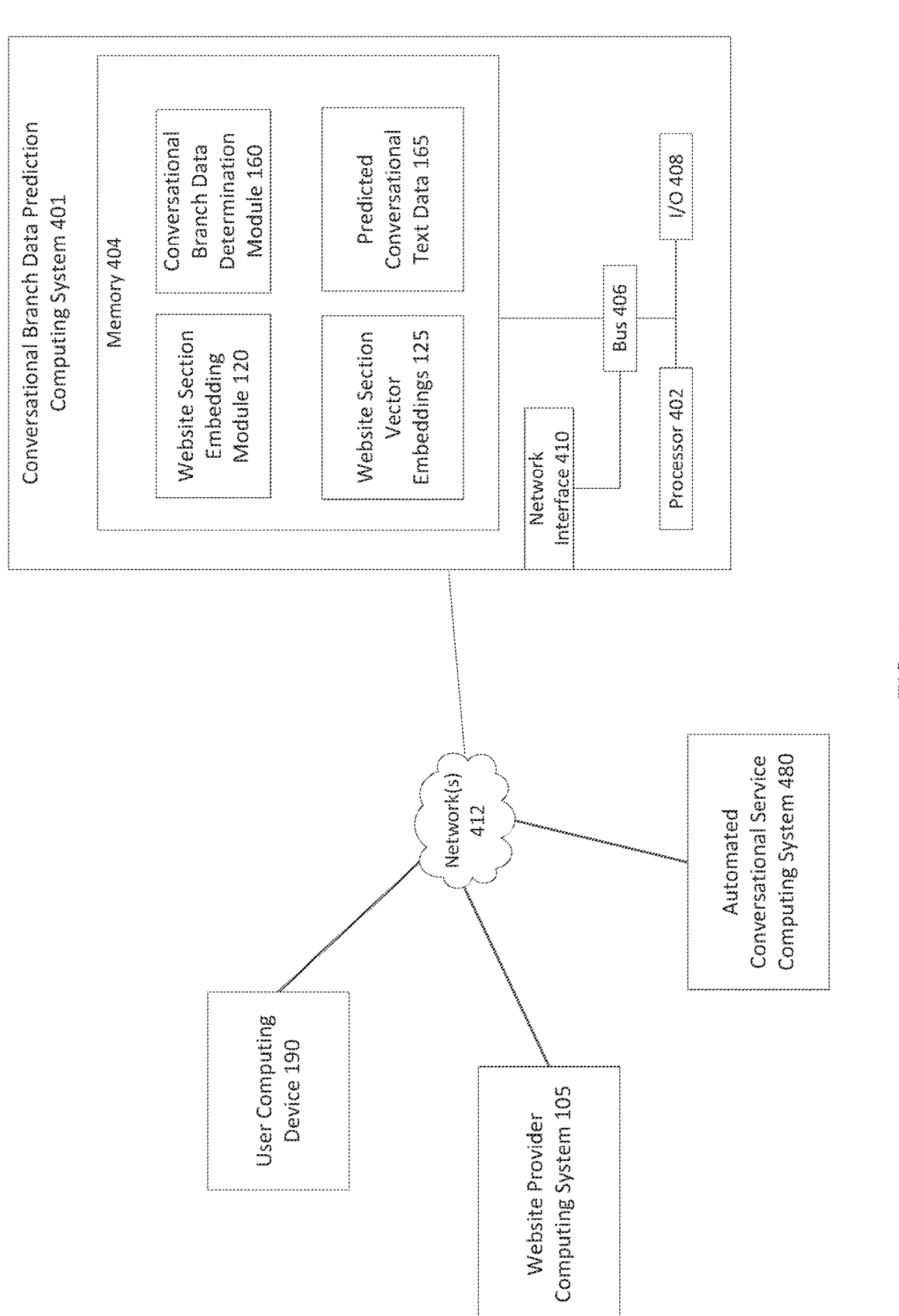
FIG. 4 is a block diagram depicting an example of a computing system for implementing a conversational branch data prediction system, according to certain embodiments.

Any suitable computing system or group of computing systems can be used for performing the operations described herein. For example, FIG. 4 is a block diagram depicting a computing system configured to implement a conversational branch data prediction computing system, according to certain embodiments.

The depicted example of a conversational branch data prediction computing system 401 includes one or more processors 402 communicatively coupled to one or more memory devices 404. The processor 402 executes computer-executable program code or accesses information stored in the memory device 404. Examples of processor 402 include a microprocessor, an application-specific integrated circuit ("ASIC"), a field-programmable gate array ("FPGA"), or other suitable processing device. The processor 402 can include any number of processing devices, including one.

The memory device 404 includes any suitable non-transitory computer-readable medium for storing the website section embedding module 120, the website section vector embeddings 125, the conversational branch data determination module 160, the predicted conversational text data 165, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The conversational branch data prediction computing system 401 may also include a number of external or internal devices such as input or output devices. For example, the conversational branch data prediction computing system 401 is shown with an input/output ("I/O") interface 408 that can receive input from input devices or provide output to output devices. A bus 406 can also be included in the conversational branch data prediction computing system 401. The bus 406 can communicatively couple one or more components of the conversational branch data prediction computing system 401.

The conversational branch data prediction computing system 401 executes program code that configures the processor 402 to perform one or more of the operations described above with respect to FIGS. 1-3. The program code includes operations related to, for example, one or more of the website section embedding module 120, the website section vector embeddings 125, the conversational branch data determination module 160, the predicted conversational text data 165, or other suitable applications or memory structures that perform one or more operations described herein. The program code may be resident in the memory device 404 or any suitable computer-readable medium and may be executed by the processor 402 or any other suitable processor. In some embodiments, the program code described above, the website section embedding module 120, the website section vector embeddings 125, the conversational branch data determination module 160, and the predicted conversational text data 165 are stored in the memory device 404, as depicted in FIG. 4. In additional or alternative embodiments, one or more of the website section embedding module 120, the website section vector embeddings 125, the conversational branch data determination module 160, the predicted conversational text data 165, and the program code described above are stored in one or more memory devices accessible via a data network, such as a memory device accessible via a cloud service.

The conversational branch data prediction computing system 401 depicted in FIG. 4 also includes at least one network interface 410. The network interface 410 includes any device or group of devices suitable for establishing a wired or wireless data connection to one or more data networks 412. Non-limiting examples of the network interface 410 include an Ethernet network adapter, a modem, and/or the like. One or more additional computing systems are connected to the conversational branch data prediction computing system 401 via network 412, such as the user computing device 190, the website provider computing system 105, or an automated conversational service computing system 480. The conversational branch data prediction computing system 401 is able to communicate with one or more of the user computing device 190, the website provider computing system 105, or the automated conversational service computing system 480 using the network interface 410. Although FIG. 4 depicts the automated conversational service computing system 480 as being connected to the conversational branch data prediction computing system 401 via the networks 412, other embodiments are possible, including an automated conversational module running as a program in the memory 404 of the conversational branch data prediction computing system 401.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A system for identifying conversational branch data for an automated conversational service, the system comprising:
a website section embedding module configured for:
identifying multiple sections of multiple webpages in a website,
determining vector embeddings for the multiple sections, wherein for each particular section of the multiple sections a respective vector embedding describes text data included in the particular section, and
based on the vector embeddings for the multiple sections, identifying a subset of the multiple sections having a particular topic, wherein the subset of the multiple sections are identified across the multiple webpages in the website; and
a conversational branch data determination module configured for:
receiving event metrics data describing interactions of a user computing device that accesses the subset of the multiple sections having the particular topic,
providing, as an input to a trained machine-learning ("ML") dialogue model, the event metrics data and a subset of the vector embeddings, wherein the trained ML dialogue model is configured for determining, based on an association of the particular topic with the event metrics data, that the subset of the vector embeddings are associated with the subset of the multiple sections having the particular topic,
receiving, from the trained ML dialogue model, an identified set of conversational text data that is correlated with the subset of the vector embeddings, and
providing the identified set of conversational text data to the user computing device.

2. The system of claim 1, wherein the trained ML dialogue model is further configured for:
identifying the association of the particular topic with a) the event metrics data and b) a particular vector embedding of the vector embeddings, and
selecting the subset of the vector embeddings based on the association of the particular topic with the event metrics data and the particular vector embedding.

3. The system of claim 1, wherein the event metrics data describes the interactions of the user computing device based on one or more of: a timespent metric, a click metric, or a search metric.

4. The system of claim 1, where the website section embedding module is further configured for:
determining an additional vector embedding of a conversational branch data object, wherein the identified set of conversational text data is associated with the conversational branch data object, and
based on the additional vector embedding, identifying that the identified set of conversational text data has the particular topic.

5. The system of claim 1, the website section embedding module further configured for identifying at least one keyword associated with at least one of the vector embeddings of the multiple sections.

6. The system of claim 5, wherein the particular topic of the subset of the multiple sections is associated with the at least one keyword.

7. The system of claim 1, wherein the conversational branch data determination module is further configured for:
responsive to receiving a text input from the user computing device, providing, as an additional input to the trained ML dialogue model, an additional vector embedding of the text input,
wherein the trained ML dialogue model identifies the identified set of conversational text data based on the additional vector embedding of the text input.

8. The system of claim 1, further configured for:
identifying a characteristic of the user computing device; and
providing, as an additional input to the trained ML dialogue model, the characteristic of the user computing device, wherein the trained ML dialogue model identifies the identified set of conversational text data based on the characteristic of the user computing device.

9. A non-transitory computer-readable medium embodying program code for identifying conversational branch data for an automated conversational service, the program code comprising instructions which, when executed by a processor, cause the processor to perform operations comprising:

identifying multiple sections of multiple webpages in a website;

determining vector embeddings for the multiple sections, wherein for each particular section of the multiple sections a respective vector embedding describes text data included in the particular section;

based on the vector embeddings for the multiple sections, identifying a subset of the multiple sections having a particular topic, wherein the subset of the multiple sections are identified across the multiple webpages in the website;

receiving event metrics data describing interactions with the subset of the multiple sections having the particular topic;

providing, as an input to a trained machine-learning ("ML") dialogue model, the event metrics data and a subset of the vector embeddings, wherein the trained ML dialogue model is configured for determining, based on an association of the particular topic with the event metrics data, that the subset of the vector embeddings are associated with the subset of the multiple sections having the particular topic;

receiving, from the trained ML dialogue model, an identified set of conversational text data that is correlated with the subset of the vector embeddings; and providing the identified set of conversational text data to an additional computing device.

10. The non-transitory computer-readable medium of claim 9, wherein the trained ML dialogue model is further configured for;

identifying a) the association of the particular topic with a) the event metrics data and b) a particular vector embedding of the vector embeddings, and selecting the subset of the vector embeddings based on the association of the particular topic with the event metrics data and the particular vector embedding.

11. The non-transitory computer-readable medium of claim 9, the operations further comprising:

determining an additional vector embedding of a conversational branch data object, wherein the identified set of conversational text data is associated with the conversational branch data object; and based on the additional vector embedding, identifying that the identified set of conversational text data has the particular topic.

12. The non-transitory computer-readable medium of claim 9, the operations further comprising identifying at least one keyword associated with at least one of the vector embeddings of the multiple sections, wherein the particular topic of the subset of the multiple sections is associated with the at least one keyword.

13. The non-transitory computer-readable medium of claim 9, the operations further comprising:

responsive to receiving a text input from the additional computing device, providing, as an additional input to the trained ML dialogue model, an additional vector embedding of the text input, wherein the trained ML dialogue model identifies the identified set of conversational text data based on the additional vector embedding of the text input.

14. The non-transitory computer-readable medium of claim 9, the operations further comprising:

identifying a characteristic of the additional computing device; and providing, as an additional input to the trained ML dialogue model, the characteristic of the additional computing device, wherein the trained ML dialogue model identifies the identified set of conversational text data based on the characteristic of the additional computing device.

15. A method of identifying conversational branch data for an automated conversational service, the method including instructions that, when implemented via one or more processing devices, perform operations comprising:

identifying multiple sections of multiple webpages in a website;

determining vector embeddings for the multiple sections, wherein for each particular section of the multiple sections a respective vector embedding describes text data included in the particular section;

based on the vector embeddings for the multiple sections, identifying a subset of the multiple sections having a particular topic, wherein the subset of the multiple sections are identified across the multiple webpages in the website;

receiving event metrics data describing interactions with the subset of the multiple sections having the particular topic;

providing, as an input to a trained machine-learning ("ML") dialogue model, the event metrics data and a subset of the vector embeddings, wherein the trained ML dialogue model is configured for determining, based on an association of the particular topic with the event metrics data, that the subset of the vector embeddings are associated with the subset of the multiple sections having the particular topic;

receiving, from the trained ML dialogue model, an identified set of conversational text data that is correlated with the subset of the vector embeddings; and providing the identified set of conversational text data to an additional computing device.

16. The method of claim 15, wherein the trained ML dialogue model is further configured for:

identifying the association of the particular topic with a) the event metrics data and b) a particular vector embedding of the vector embeddings, and selecting the subset of the vector embeddings based on the association of the particular topic with the event metrics data and the particular vector embedding.

17. The method of claim 15, the operations further comprising:

determining an additional vector embedding of a conversational branch data object, wherein the identified set of conversational text data is associated with the conversational branch data object; and based on the additional vector embedding, identifying that the identified set of conversational text data has the particular topic.

18. The method of claim 15, the operations further comprising identifying at least one keyword associated with at least one of the vector embeddings of the multiple sections, wherein the particular topic of the subset of the multiple sections is associated with the at least one keyword.

19. The method of claim 15, the operations further comprising:

responsive to receiving a text input from the additional computing device, providing, as an additional input to the trained ML dialogue model, an additional vector embedding of the text input, wherein the trained ML dialogue model identifies the identified set of conversational text data based on the additional vector embedding of the text input.

20. The method of claim 15, the operations further comprising:

identifying a characteristic of the additional computing device; and providing, as an additional input to the trained ML dialogue model, the characteristic of the additional computing device, wherein the trained ML dialogue model identifies the identified set of conversational text data based on the characteristic of the additional computing device.

* * * * *